United States Patent
Lin

(10) Patent No.: US 7,827,249 B2
(45) Date of Patent: Nov. 2, 2010

(54) SYSTEM AND METHOD FOR AUTOMATICALLY LINKING MULTIPLE CONSOLES

(75) Inventor: Ching-Yi Lin, Taoyuan Hsien (TW)

(73) Assignee: Delta Electronics, Inc., Taoyuan (TW)

( * ) Notice: Subject to any disclaimer, the term of this patent is extended or adjusted under 35 U.S.C. 154(b) by 809 days.

(21) Appl. No.: 11/556,261

(22) Filed: Nov. 3, 2006

(65) Prior Publication Data

US 2008/0109525 A1   May 8, 2008

(51) Int. Cl.
G06F 15/16 (2006.01)
(52) U.S. Cl. .................. 709/208; 709/220; 709/230; 700/3
(58) Field of Classification Search .................. 709/208, 709/209, 220–222, 228, 245, 253, 230; 710/3, 710/4, 8–12, 107, 110; 700/2, 3, 8, 9, 11, 700/20
See application file for complete search history.

(56) References Cited

U.S. PATENT DOCUMENTS

| | | | | |
|---|---|---|---|---|
| 5,826,037 | A * | 10/1998 | Stiegler et al. | 709/251 |
| 5,914,957 | A * | 6/1999 | Dean et al. | 370/438 |
| 6,928,501 | B2 * | 8/2005 | Andreas et al. | 710/110 |
| 6,996,644 | B2 * | 2/2006 | Schoch et al. | 710/107 |
| 7,080,150 | B1 * | 7/2006 | Wehrle et al. | 709/230 |
| 7,237,041 | B2 * | 6/2007 | Hatte | 710/3 |
| 7,310,688 | B1 * | 12/2007 | Chin | 709/252 |
| 7,330,766 | B2 * | 2/2008 | Kuwayama et al. | 700/3 |
| 7,412,530 | B1 * | 8/2008 | Wehrle et al. | 709/230 |
| 2002/0188781 | A1 * | 12/2002 | Schoch et al. | 710/107 |
| 2006/0020372 | A1 * | 1/2006 | Watabe | 701/1 |

\* cited by examiner

*Primary Examiner*—Jungwon Chang
(74) *Attorney, Agent, or Firm*—Chun-Ming Shih; HDLS IPR Services

(57) ABSTRACT

A linking system automatically sets communication protocol and station numbers for multiple consoles. One console is set as master console and the remaining consoles are set as slave consoles. Each console comprises a serial input end, a serial output end and a master/slave communication end. The serial output end of one slave console is connected to the serial input end of a next console to form a console series, while the master/slave communication ends of all consoles are in parallel connection. The master console sends communication protocol data to all slave consoles to set up the slave consoles. The first slave console generates a serial number of one and sends the serial number to next slave console. The serial number is added by one in the next slave console. This process is performed for each slave console and the final serial number is sent to the master console. Therefore, the maser console identifies the number of slave consoles and can assign station number for the slave consoles.

9 Claims, 3 Drawing Sheets

SYSTEM AND METHOD FOR AUTOMATICALLY LINKING MULTIPLE CONSOLES

BACKGROUND OF THE INVENTION

1. Field of the Invention

The present invention relates to linking of multiple consoles, especially to a linking system and method for automatically setting up communication protocol and station number of consoles.

2. Description of Prior Art

In automatic control, a distribution control system is often employed to connect a plurality of consoles. The consoles in the distribution control system should be connected with suitable communication protocol for normal operation.

FIG. 1 shows a prior art master-slave architecture for a plurality of consoles, where the slave consoles are controlled by at least one master console. The consoles should communicate with complied protocol such as baud rate, coding format and even/odd parity. Moreover, the consoles should be assigned with unique station number (ID number) for identifying each other. However, the consoles in prior art master-slave architecture cannot automatically set up unified communication protocol and station numbers. The task of setting up should be performed by trial and error manually. The setting of communication protocol has the erroneous risk due to manual mistake.

SUMMARY OF THE INVENTION

The invention is to provide a linking system and method for automatically setting up communication protocol and station number of consoles by the master console. Therefore, the risk of manual operation error can be prevented and the set up time is reduced.

The features of the invention believed to be novel are set forth with particularity in the appended claims. The invention itself however may be best understood by reference to the following detailed description of the invention, which describes certain exemplary embodiments of the invention, taken in conjunction with the accompanying drawings in which:

DETAILED DESCRIPTION OF THE INVENTION

Figure 1:
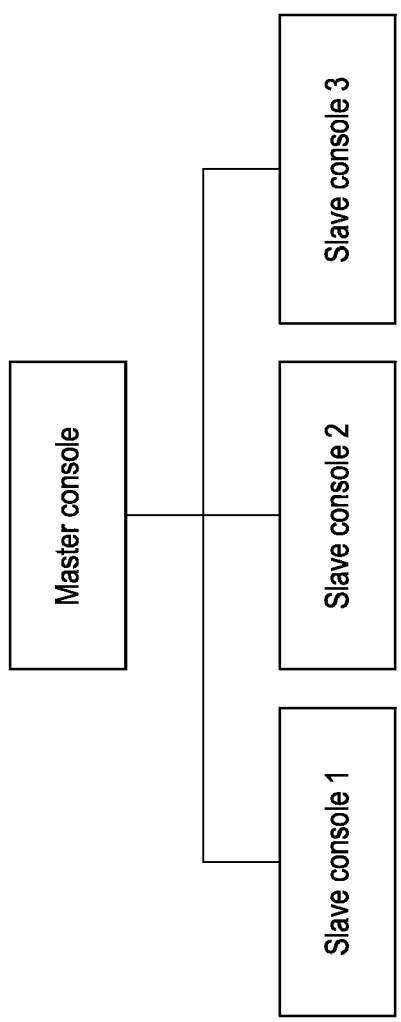
FIG. 1 shows a prior art master-slave architecture for a plurality of consoles.
Figure 2:
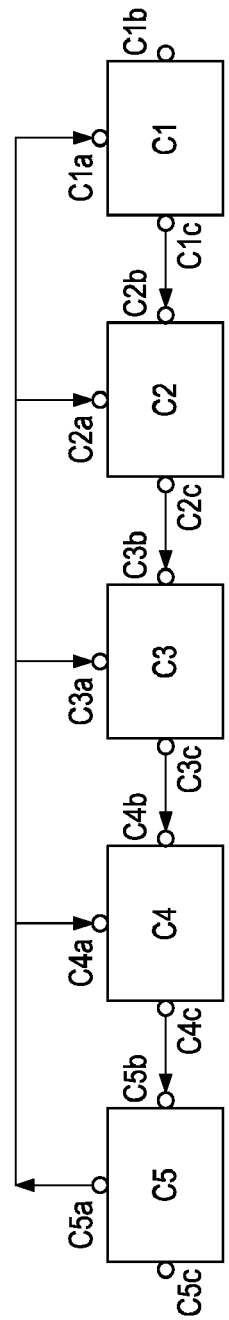
FIG. 2 shows the block diagram of the linking system for automatically linking a plurality of consoles according to the present invention.

FIG. 2 shows the block diagram of the linking system for automatically linking a plurality of consoles, which is exemplified with one master console and four slave consoles. However, the number of consoles can be changed according to practical requirement. The master console is labeled with C5 and the slave consoles are labeled with C1-C4, respectively.

Each of the consoles C1-C5 comprises a master/slave communication end (C1a~C5a), a serial input end (C1b~C5b), and a serial output end (C1c~C5c). The master/slave communication ends C1a~C4a of the slave consoles C1-C4 are electrically connected to the master/slave communication ends C5a of the master console C1. The serial output end (C1c~C4c) of the slave consoles C1-C4 are electrically connected to the serial input end (C2b~C5b) of consoles C2-C5 of next stage. For example, the serial output end C3c of the third slave console C3 is electrically connected to the serial input end C4b of the fourth console C4. The serial output end C4c of the fourth slave console C4 is electrically connected to the serial input end C5b of the master console C5. The serial output end C5c of the master console C5 and the serial input end C1b of the first console C1 are idle (not connected). Taking a system with N consoles as example, the master console has label CN, and the slave consoles have lave labels C1~C(N−1). The master/slave communication end (C1a~CNa) are connected in parallel. The serial output end CMc of one console is electrically connected to the serial input end C(M+1)b of next-stage console, where $1 \leq M < N$. Moreover, the serial output end CNc of the master console CN and the serial input end C1b of the first console C1 are idle (not connected). In this serial-connection system, the console with idle serial input end is assigned as the first console C1. Therefore, any console can judge whether it is the first console C1 in the system by checking the connection status of the serial input end. The master console is at the last stage. Namely, the console with idle serial output end is assigned as master console.

Figure 3:
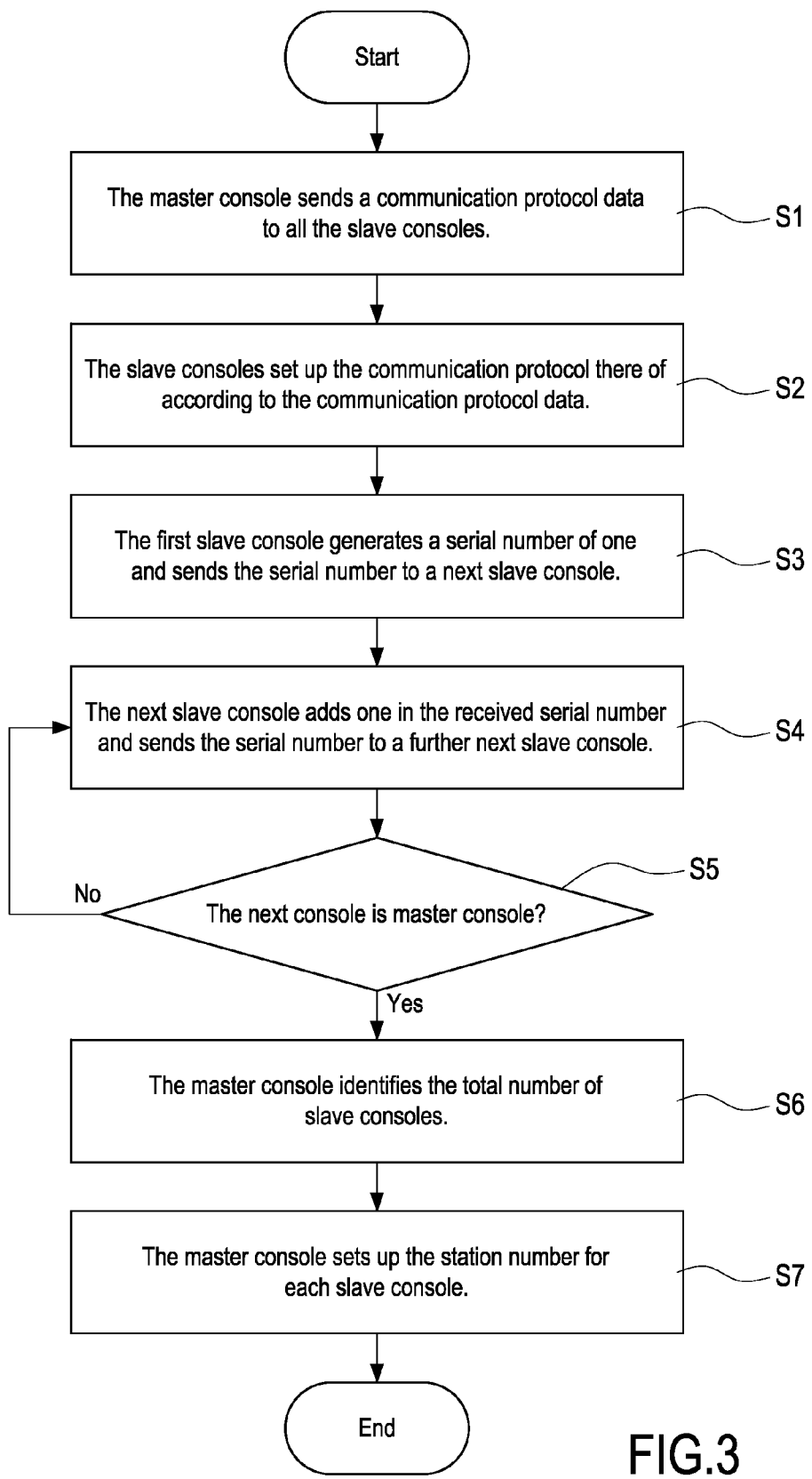
FIG. 3 shows the flowchart of the linking method of the present invention.

FIG. 3 shows the flowchart of the linking method of the present invention, which is used to link a plurality of consoles. In step S1, an operator or a software program sends a communication protocol data from the master/slave communication ends C5a of the master console C5 to the master/slave communication end (C1a~C4a) of the slave consoles C1-C4. In step S2, the slave consoles C1-C4 set up their own communication protocol according to the communication protocol data. In step S3, the first slave console C1 with idle serial input end generates a serial number of one and then sends the serial number to the serial input end C2b of the next console (namely, the second console) through the serial output end C1c thereof. In step S4, the second console C2 receives the serial number and adds one to the serial number, and then sends the updated serial number to next stage console. Step S5 judges whether the next console is the master console. If false, the next console is still slave console and step S4 is repeated again. Otherwise, step S6 is performed. In step S6, the master console identifies the total number of the slave consoles by the final serial number. In step S7, the master console sets up the station numbers for the slave consoles C1-04 through the master/slave communication ends (C1a~C5a). Therefore, the setting task of communication protocol and station number for all slave consoles can be completed.

Figure 4:
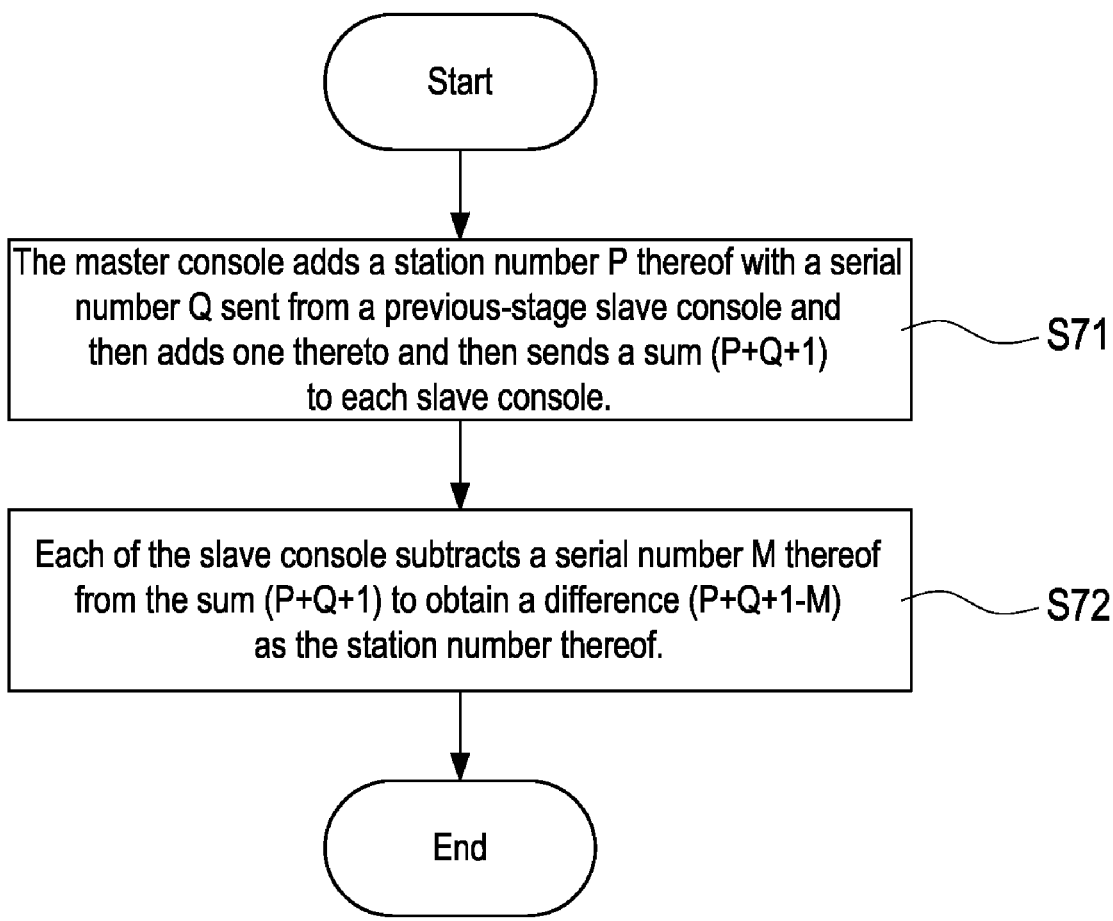
FIG. 4 shows the flowchart of setting station numbers.

In the preferred embodiment, the linking system can link the consoles C1-C5 into a console series. The master console C5 is set with communication protocol and station number P. The remaining slave consoles C1-C4 can be set with the same communication protocol as the master console C5. The station number for those slave consoles can be set as P+1, P+2 . . . P+Q, where Q is the total number of the slave consoles. Therefore, communication can be performed without setting up the station number serially. FIG. 4 shows the flowchart of setting station numbers, where the station number of the master console is known as P and the serial number sent from the previous slave console is Q (the total number of slave consoles). In step S71, the master console receives the serial number of Q and adds P and one to the serial number of Q to obtain the sum (P+Q+1). The sum (P+Q+1) is then sent to all slave console through the master/slave communication ends. In step S72, the slave console subtracts the serial number M thereof from the received sum (P+Q+1) to obtain a difference (P+Q+1−M), which is used as the station number thereof. Taking the system in FIG. 2 as example, there are 5 consoles connected together. Therefore, the total serial number of Q is 4 and the sum (P+Q+1) sent by the master console is P+5. The fourth slave console C4 with serial number 4 (M=4) has the station number P+1. The remaining slave consoles have the station numbers of (P+2), (P+3) and (P+4), respectively.

The communication protocol data preferably has data length of one byte (8 bits) and each of the bits in the communication protocol data has following indication:

Bit 7 indicates encoding format, where 0 indicates ASCII code, and 1 indicates Remote Terminal Unit (RTU) code.

Bit 6 indicates stop bit number, where 0 indicates two stop bits, and 1 indicates one stop bit.

Bit 5 indicates data length, where 0 indicates 8-bit data length, and 1 indicates 7-bit data length.

Bits 4 and 3 indicate status of check bits, where 00 indicates no check bit, 01 indicates even parity, and 10 indicates odd parity.

Bits 2, 1 and 0 indicate communication speed, where 000 indicates 2400 bps baud rate, 001 indicates 4800 bps baud rate, 010 indicates 9600 bps baud rate, 011 indicates 19200 bps baud rate, and 100 indicates 38400 bps baud rate.

For example, when the communication protocol is ASCII code, two stop bits, 7-bit data length, even parity, and 9600 bps baud rate, the master console C5 sends the communication protocol data of 00101010 (8 bits) to all slave consoles C1-C4. The master console sends one bit data for every 2 ms. Therefore, the slave consoles C1-C4 can get the communication protocol data of 00101010 for every 2 ms. The third slave console C3 sends serial number of 3 to the next slave console C4. When the serial number has data length of 8 bits, the serial number sent from the third slave console C3 is 00000011. The fourth slave console C4 will add one to the serial number and sends the serial number of 00000100 to the master console C5. Therefore, as many as 256 slave consoles can be connected when the serial number has data length of 8 bits. Those skill in the related art know that the serial number is not limited to data length of 8 bits and can be changed according to practical need.

After the consoles are connected and supplied with power, the initial values of the master/slave communication ends (C1a~C5a) are one. For automatic connection, the master console C5 sends signal of zero to the master/slave communication end and waits for 2 seconds to synchronize the slave consoles C1-C4. The slave consoles C1-C4 are in standby state for connection when the signal from the master/slave communication end of the master console is zero. The master console then sends signal of one to all slave consoles C1-C4, which is a starting bit and the signal following the starting bit is communication protocol data. The communication protocol data is sent by one bit for every 2 ms.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

What is claimed is:

1. An automatic linking system for multiple consoles, wherein one of the consoles is a master console and the remaining consoles are slave consoles, each console comprising:

a master/slave communication end for conveying control command of the master console to the slave consoles;

a serial input end for inputting data; and a serial output end for outputting data;

wherein the master/slave communication ends of all consoles are in parallel connection;

wherein the serial output end of one console is connected to the serial input end of another console to form a console series;

wherein the consoles are configured to determine a first slave console if the serial input end of the first slave console is idle in the formed console series, the consoles are configured to determine a master console if the serial output end of the master console is idle in the formed console series;

wherein the master console and the first slave console are at opposite ends of the console series;

wherein the master console is configured to send a communication protocol data to all slave consoles to set up communication protocol for slave consoles;

wherein the first slave console is configured to generate a serial number of one and send the serial number to the second slave console;

wherein the second slave console is configured to add one in the received serial number and send the serial number to next slave console; the remaining slave consoles are configured to repeat the operation of adding one to the serial number and sending the serial number to next slave console;

wherein the last slave console is configured to send the serial number to the master console whereby the master console identifies the number of slave consoles and assigns station number for the slave consoles.

2. The system as in claim 1, wherein the communication protocol data has data length of one byte.

3. The system as in claim 2, wherein each bit in the communication protocol data has following indications:

bit 7 indicating encoding format, where 0 indicates ASCII code, and 1 indicates remote terminal unit (RTU) code;

bit 6 indicating stop bit number, where 0 indicates two stop bits, and 1 indicates one stop bit;

bit 5 indicating data length, where 0 indicates 8-bit data length, and 1 indicates 7-bit data length;

bits 4 and 3 indicating status of check bits, where 00 indicates no check bit, 01 indicates even parity, and 10 indicates odd parity;

bits 2, 1 and 0 indicating communication speed, where 000 indicates 2400 bps baud rate, 001 indicates 4800 bps baud rate, 010 indicates 9600 bps baud rate, 011 indicates 19200 bps baud rate, and 100 indicates 38400 bps baud rate.

4. The system as in claim 1, wherein the serial number has data length of one byte.

5. An automatic linking method for multiple consoles, wherein each of the consoles comprises a master/slave communication end, a serial input end and a serial output end; wherein the serial output end of one console is connected to the serial input end of another console and the master/slave communication ends of all consoles are in parallel connection to form a console series; the method comprising the steps processed in order of:

a1) determining a master console if the serial output end of the master console is idle in the formed console series;

a2) determining a first slave console in the console series if the serial input end of the first slave console is idle in the formed console series, and wherein master console and the first slave console are at opposite ends of the console series;

a). the master console sending a communication protocol data to all the slave consoles;

b). the slave consoles setting up the communication protocol thereof according to the communication protocol data;

c). the first slave console generating a serial number of one and sending the serial number to a next slave console;

d). the next slave console adding one in the received serial number and sending the serial number to a further next slave console;

e). repeating step d);

f). when the master console receives the serial number from a slave console connected thereto, the master console sets a total number of the slave consoles equal to the received serial number;

g). the master console setting up station number for each slave console through the master/slave communication end.

6. The method as in claim 5, wherein the step g) further comprises:

g1). the master console adding a station number P thereof with a serial number Q sent from a previous-stage slave console and then adding one thereto and then sending a sum (P+Q+1) to each slave console;

g2). each of the slave console subtracting a serial number M thereof from the sum (P+Q+1) to obtain a difference (P+Q+1−M) as the station number thereof.

7. The method as in claim 6, wherein the serial number has data length of one byte.

8. The method as in claim 5, wherein the communication protocol data has data length of one byte.

9. The method as in claim 8, wherein each bit in the communication protocol data has following indications:

bit 7 indicating encoding format, where 0 indicates ASCII code, and 1 indicates remote terminal unit (RTU) code;

bit 6 indicating stop bit number, where 0 indicates two stop bits, and 1 indicates one stop bit;

bit 5 indicating data length, where 0 indicates 8-bit data length, and 1 indicates 7-bit data length;

bits 4 and 3 indicating status of check bits, where 00 indicates no check bit, 01 indicates even parity, and 10 indicates odd parity;

bits 2, 1 and 0 indicating communication speed, where 000 indicates 2400 bps baud rate, 001 indicates 4800 bps baud rate, 010 indicates 9600 bps baud rate, 011 indicates 19200 bps baud rate, and 100 indicates 38400 bps baud rate.

* * * * *